July 12, 1932. A. W. BRUCE 1,866,839
TRUCK FOR RAILROAD VEHICLES
Filed Sept. 13, 1927 3 Sheets-Sheet 1
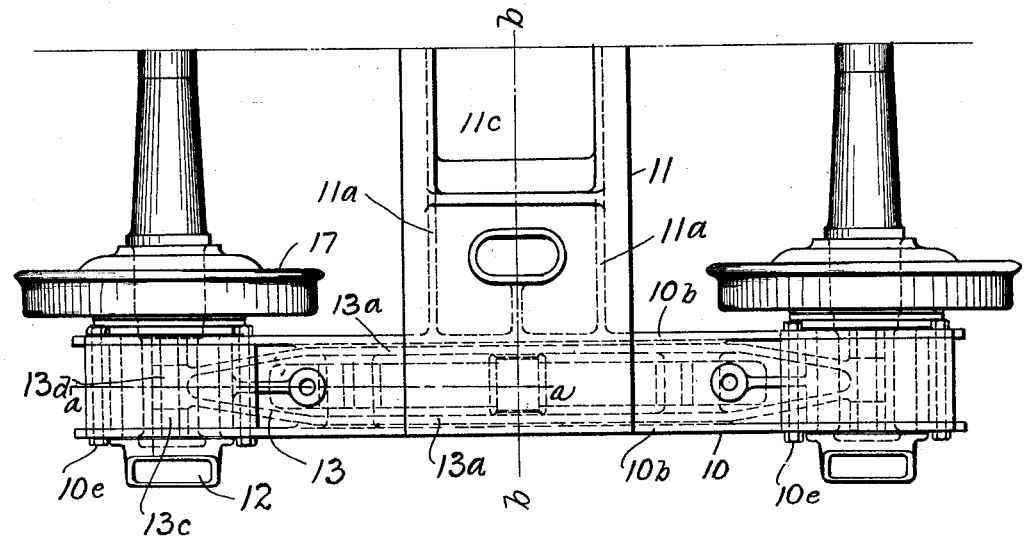
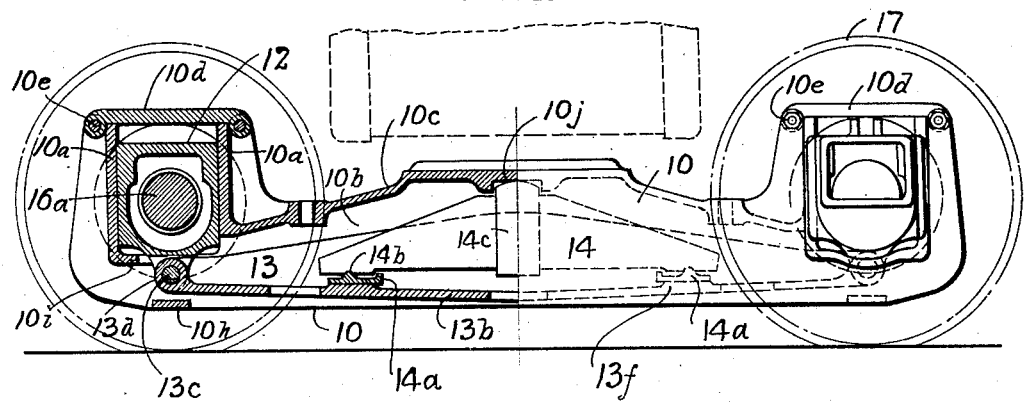
WITNESSES
A. S. Vanderbilt
S. R. Bell
INVENTOR
Alfred W. Bruce
by J. Howden Bell
Atty July 12, 1932. A. W. BRUCE 1,866,839
TRUCK FOR RAILROAD VEHICLES
Filed Sept. 13, 1927 3 Sheets-Sheet 2
-FIG.3.-
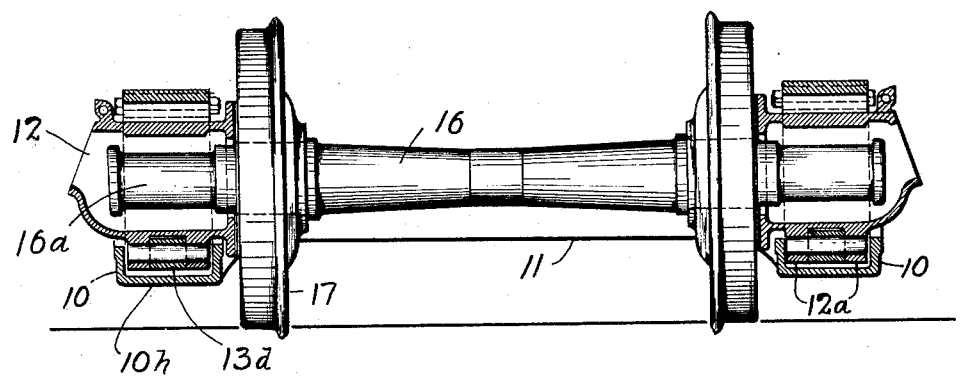
-FIG.4.-
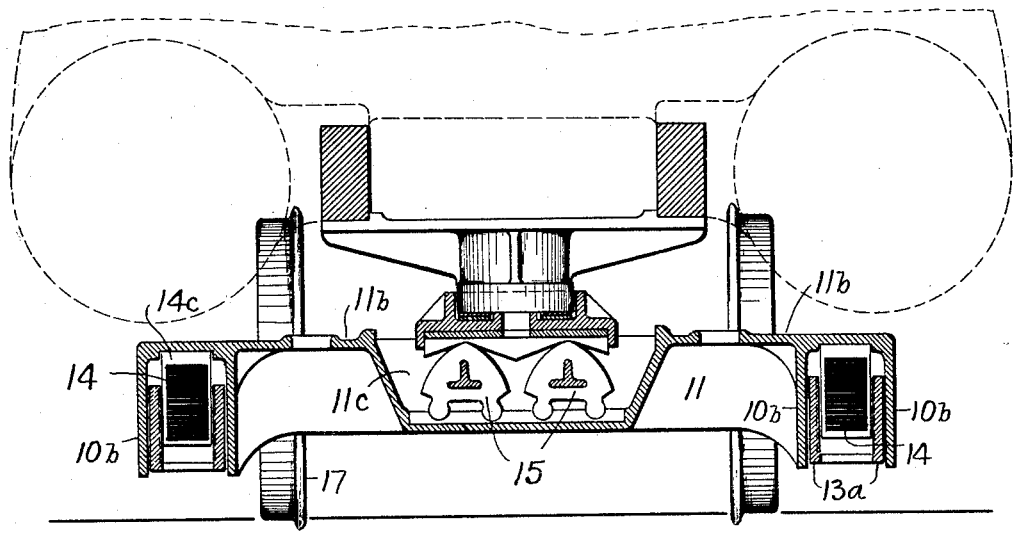

July 12, 1932.  A. W. BRUCE  1,866,839
TRUCK FOR RAILROAD VEHICLES
Filed Sept. 13, 1927  3 Sheets-Sheet 3
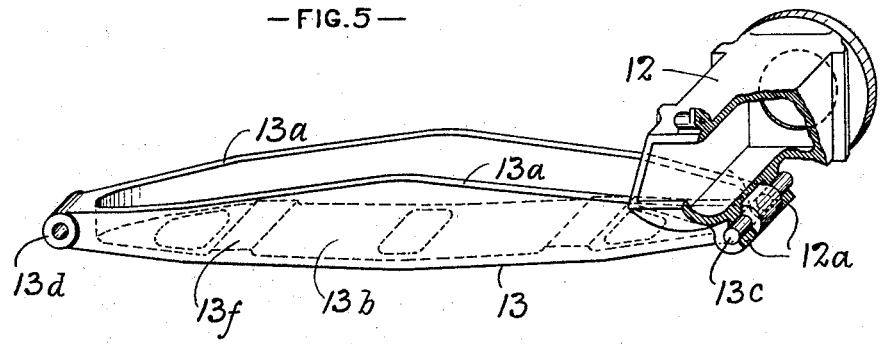
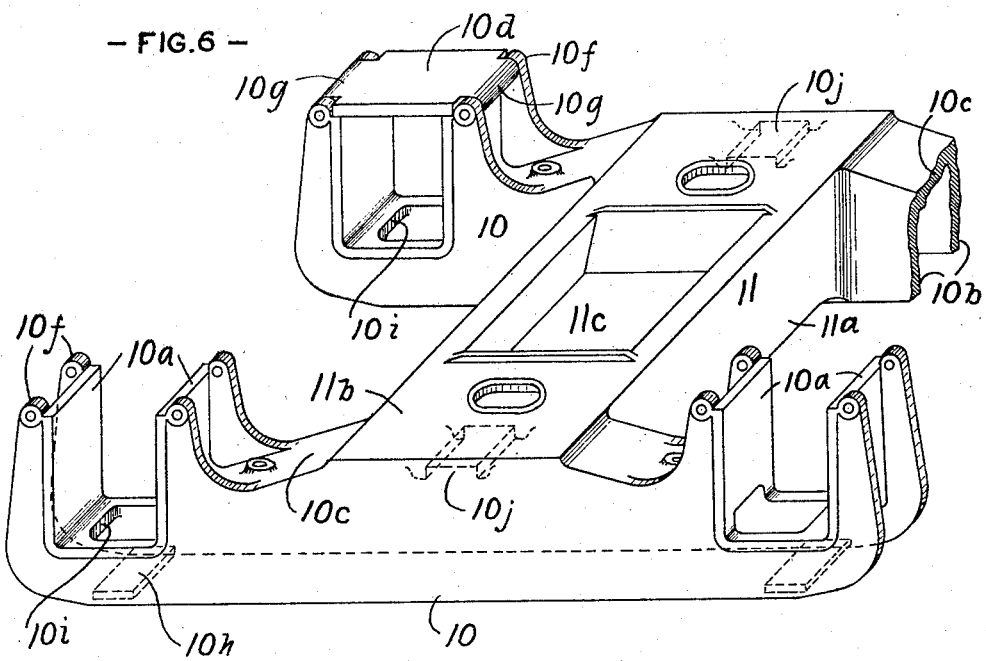

Patented July 12, 1932

1,866,839

UNITED STATES PATENT OFFICE

ALFRED W. BRUCE, OF NEW YORK, N. Y.

TRUCK FOR RAILROAD VEHICLES

Application filed September 13, 1927. Serial No. 219,253.

This invention relates to trucks for railroad vehicles, and its object is to provide a truck of such character, which can be easily and economically manufactured; which embodies a minimum number of parts; which is compact and durable in construction; which is characterized by stable riding qualities; and which affords the maximum overhead clearnce.

The improvement claimed is hereinafter fully set forth.

In the accompanying drawings: Figure 1 is a view, one half in side elevation and one half in vertical longitudinal section, taken on the line $a\ a$ of Fig. 2, of a truck embodying the invention; Fig. 2, a plan view of one half of the truck; Fig. 3, an end view of the same, the journal boxes and certain of the associated parts being shown in middle vertical longitudinal section; Fig. 4, a vertical transverse section through the truck, taken on the line, $b\ b$ of Fig. 2, certain of the superposed parts of a locomotive being shown in dotted lines; Fig. 5, a perspective view of the equalizing lever and one of the journal boxes, portions of the journal box being broken away, and; Fig. 6, a similar view, with portions broken away, of the truck frame, one of the binders being shown in place.

In the practice of the invention, referring descriptively to the specific embodiment thereof which is herein exemplified, as applied in a four wheel leading truck, of the outside bearing type, for locomotives, the truck frame is formed as an integral, or one piece, casting, and comprises two side frame members, 10, and a transom, 11. The side frame members are mounted on the journals, 16a, of the axles, 16, said journals being disposed outside of the wheels, 17.

Each side frame member is formed, at each end, with a pair of pedestal jaws, 10a, between which a journal box, 12, is fitted for vertical sliding movement. The pedestal jaws are connected by two spaced, longitudinal, vertical walls, 10b, which are joined together by a top wall, 10c. The side walls and the top wall of each side frame member, form a pocket for the reception of an equalizing lever, 13, and a longitudinally disposed plate spring, 14, which is seated in a pocket in the lever.

Each pair of pedestal jaws is provided with a binder, 10d, which is attached to each pedestal by a bolt, 10e, which passes through a pair of aligned lugs, 10f, formed on the pedestal jaws, and a lug, 10g, formed on the end of the binder.

The side walls, 10b, of each side frame member, are reinforced, at each end, by a strut, 10h, disposed below, and intermediate each pair of pedestal jaws. The struts are also adopted to serve as safety guards, to prevent the equalizer levers from dropping out of the side frame members, in the event that their ends become detached from the journal boxes.

A transverse flange, 10i, is provided at the bottom of the outside pedestal jaw of each pair, to limit relatively downward movement of the journal boxes.

Each equalizer lever, 13, is of substantially U shape in cross section, and comprises two, spaced, longitudinal, vertical side walls, 13a, which are joined together by a horizontal bottom wall, 13b. The side walls and the bottom wall form a pocket for the plate spring, 14. The lever is pivotally connected, at each end, to the lower end of one of the journal boxes, 12, by a pin, 13c, which passes through a pair of aligned lugs, 12a, formed on the bottom of the journal box, and a lug, 13d, formed on the end of the lever.

Each end of the spring, 14, bears on a plate, 14a, which, in turn, is slidably mounted on a bearing boss, 13f, formed on the upper face of the bottom wall, 13b, of the equalizer lever. The plates, 14a, are each keyed to the ends of the springs by a lug, 14b, which fits in a groove formed in the end of the spring.

Each spring fulcrums through a spring band, 14c, which is seated in a transverse groove, 10j, formed on the lower face of the top wall, 10c, of each side frame.

The transom, 11, comprises two spaced vertical side walls, 11a, and a horizontal top wall, 11b, which joins the side walls together. A pocket, 11c, is provided centrally of the transom, for the reception of a suitable lateral motion device. One type of such device is illustrated in Fig. 4, of the drawings, and embodies the three point rockers, 15, well known in practice.

The improved truck possesses the following important advantages; it can be easily and economically manufactured; it comprises a minimum number of parts, which feature conduces to low maintenance costs; it is compact and durable; and it has the equalizer levers disposed below the journals which feature insures maximum stability in riding, and a truck frame construction is employed which affords the maximum overhead clearance. It is to be particularly noted that in large locomotives, the provision of substantial clearance above the top of the truck is an important factor.

The invention claimed as new and desired to be secured by Letters Patent, is:

1. In a frame for trucks for railroad vehicles, the combination of a pair of side frame members, each side frame member embodying two pairs of inverted pedestal jaws, and means between the pairs of pedestal jaws adapted to engage a support for supporting the side frame member from beneath the said frame member; and a cross member, connecting the side frame members.

2. In a frame for trucks for railroad vehicles, the combination of a pair of side frame members, each side frame member embodying two pairs of inverted pedestal jaws; a binder, connecting the upper ends of each pair of pedestal jaws; and a cross member, connecting the side frame members.

3. In a frame for trucks for railroad vehicles, the combination of a pair of side frame members, each side frame member embodying two pairs of inverted pedestal jaws; a detachable binder, connecting the upper ends of each pair of pedestal jaws; and a cross member connecting the side frame members.

4. In a frame for trucks for railroad vehicles, formed as an integral casting, the combination of a pair of side frame members, each embodying two pairs of inverted pedestal jaws, and means between the pairs of pedestal jaws adapted to engage a support for supporting the side frame member from beneath the said frame member; and a cross member connecting the side frame members.

5. In a frame for trucks for railroad vehicles, formed as an integral casting, the combination of two side frame members, each comprising two pairs of inverted pedestal jaws, and a longitudinal member, connecting the pairs of pedestal jaws, and disposed below their tops; and a cross member, connecting the side frame members.

6. In a frame for trucks for railroad vehicles, formed as an integral casting, the combination of two side frame members, each comprising two pairs of inverted pedestal jaws, and a longitudinal member connecting the pairs of pedestal jaws and disposed below their tops, the said member comprising two spaced vertical side walls, and a top wall joining the side walls; and a cross member connecting the side frame members.

7. In a frame for trucks for railroad vehicles, the combination of an integral casting, comprising a pair of side frame members, each embodying two pairs of inverted pedestal jaws, and a longitudinal member connecting the pairs of pedestal jaws; a cross member, connecting the side frames; and a detachable binder connecting the tops of each pair of pedestal jaws.

8. In a frame for trucks for railroad vehicles, the combination of an integral casting, comprising a pair of side frame members, each embodying two pairs of inverted pedestal jaws, and a longitudinal member, connecting the pairs of pedestal jaws and disposed below their tops, and embodying two vertical side walls and a top wall; a cross member, connecting the side frame members; and a detachable binder, connecting the tops of each pair of pedestal jaws.

9. In a truck for railroad vehicles, the combination of a pair of side frame members, each embodying a pair of inverted pedestal jaws, and a longitudinal member connecting the pairs of pedestal jaws; a journal box, slidably mounted in each pair of pedestal jaws; a pair of equalizer levers, one disposed on each side of the truck, each lever being pivotally connected at each end to one of the journal boxes on its respective side of the truck; and a cross member, connecting the side frame members.

10. In a truck for railroad vehicles, the combination of a pair of side frame members, each embodying a pair of inverted pedestal jaws, and a longitudinal member, connecting the pairs of pedestal jaws; a journal box, slidably mounted in each pair of pedestal jaws; a pair of equalizer levers, one disposed on each side of the truck, each lever being pivotally connected to the pair of journal boxes on its respective side of the truck; a detachable binder, connecting the tops of each pair of pedestal jaws; and a cross member, connecting the side frame members.

11. In a truck for railroad vehicles, the combination of a pair of side frame members, each embodying a pair of inverted pedestal jaws, and a longitudinal member, connecting the pairs of pedestal jaws; a journal box, slidably mounted in each pair of pedestal jaws; a pair of equalizer levers, one disposed on each side of the truck, each lever being pivotally connected to the pair of journal boxes on its respective side of the truck; a detachable binder, connecting the top of each pair of pedestal jaws; a pair of plate springs, one disposed on each side of the truck, each spring having its ends slidably mounted on one of the equalizer levers, and its top central portion fulcrumed on the longitudinal member of a side frame; and a cross member connecting the side frame members.

12. In a truck for railroad vehicles, the combination of an integral casting, comprising a pair of side frame members, and a cross member, connecting the side frame members, each side frame member embodying two pairs of inverted pedestal jaws, and a longitudinal member, connecting the pairs of pedestal jaws, and comprising two spaced, vertical side walls, and a top wall connecting the side walls, the said walls forming a pocket for an equalizer lever; a journal box slidably mounted in each pair of pedestal jaws; a pair of equalizer levers, one housed in the pocket of each side frame member, each lever having its ends pivotally connected to the journal boxes on its respective side of the truck; and a pair of plate springs, one housed in the pocket of each side frame member, and bearing on the underside of the top wall of the pocket in which it is housed, and on the top of the equalizer lever disposed in the same pocket.

13. In a truck for railroad vehicles, the combination of an integral casting, comprising a pair of side frame members, each side frame member embodying two pairs of inverted pedestal jaws, and a longitudinal member, connecting the pairs of pedestal jaws, and comprising two spaced, vertical side walls, and a top wall connecting the side walls, the said walls forming a pocket for an equalizer lever; a journal box slidably mounted in each pair of pedestal jaws; a pair of equalizer levers, one housed in the pocket of each side frame member, each lever having its ends pivotally connected to the journal boxes on its respective side of the truck, and comprising two spaced, vertical side walls and a bottom wall; and a pair of plate springs, one housed in the pocket of each side frame, each spring having its ends slidably bearing on the bottom wall of the lever, and its top central portion fulcrumed on the under side of the top wall of the pocket.

14. In a truck of the outside bearing type, for railroad vehicles, the combination of a pair of wheeled axles, having their journals disposed outside of the wheels; a pair of side frame members, each side frame member comprising two pairs of pedestal jaws, and a longitudinal member connecting the pedestals; a journal box for each of the journals, in each pair of pedestal jaws; a pair of equalizer levers, one disposed on each side of the truck below the journals, and pivotally connected to the journal boxes on its respective side of the truck; and a pair of plate springs, one disposed on each side of the truck, and bearing on the equalizer lever and the longitudinal side frame member, on its respective side of the truck.

15. In a truck of the outside bearing type for railroad vehicles, the combination of a pair of wheeled axles, having their journals disposed outside the wheels; an integral casting, comprising a pair of side frame members, one on each side of the truck, and a transom, connecting the side frame members, and formed with a central pocket for a lateral motion device, each side frame member comprising two pairs of inverted pedestal jaws, and a longitudinal member connecting the pedestals, and embodying two vertical side walls, a top wall joining the side walls, and formed with a fulcrum recess, the said walls forming a pocket, and struts connecting the side walls, one disposed directly below each pair of pedestal jaws; a journal box for each of the journals, in each pair of pedestal jaws; an equalizer lever, disposed in the pocket in each side frame member and pivotally connected, at each end, by a knuckle formed thereon, to one of the journal boxes, each lever comprising two vertical side walls, and a bottom wall formed with a pair of bearing bosses; a sliding plate mounted on each bearing boss; and a plate spring for each equalizer lever, having its ends mounted on the bearing plates of the lever; and a spring band disposed centrally of each spring and fitted in one of said fulcrum recesses.

16. In a truck for railroad vehicles, the combination of a pair of journal boxes; a side frame member movable vertically relative to the journal boxes and embodying pairs of pedestal jaws at its ends and a part between and connecting the jaws disposed below the tops of said jaws and arranged to provide an unobstructed space between said pairs of jaws and above said connecting part; resilient means for said side frame member disposed beneath said space and beneath the upper portion of said side frame member, said upper portion bearing directly upon and being supported by said resilient means, said resilient means being connected to the lower ends of said journal boxes and a transom having its upper surface entirely below the tops of said jaws and connected at one end to said side frame member.

17. In a truck for railroad vehicles, the combination of a pair of journal boxes; a side member embodying pairs of pedestal jaws at its ends movable vertically relative to the journal boxes, and a part between and connecting the jaws spacing the said journal boxes and being disposed below the tops of said jaws and adapted to provide an unobstructed space between said pairs of jaws and above said connecting part; a bar beneath the upper portion of the side member and connected to the lower end of said journal boxes; and resilient means between the side member and bar.

18. In a truck for railroad vehicles, the combination of a pair of journal boxes; a side frame member embodying pairs of pedestal jaws at its ends and a part between and connecting said jaws, and movable vertically relatively to the journal boxes, said connecting part of the side member being disposed below the tops of the jaws and adapted to provide thereby an unobstructed space between the pairs of jaws and above said connecting part; a bar beneath said unobstructed space and beneath the upper wall of said connecting part connecting the lower ends of the journal boxes; and a spring between the bar and frame member supported on the bar and supporting said frame member.

19. In a truck for railroad vehicles, the combination of a pair of journal boxes; a side frame member movable vertically relative to the journal boxes and embodying pairs of pedestal jaws at its ends and a part between and connecting the jaws disposed below the said jaws and adapted to provide thereby an unobstructed space between said pairs of jaws and said connecting part; a bar disposed beneath said space and beneath the upper portion of said connecting part connecting the lower ends of the journal boxes; a spring positioned over the bar and supported from beneath by the same, said spring member supporting the frame member from beneath said frame member; and means slidably disposed between the spring and bar at their points of contact.

ALFRED W. BRUCE.